(12) United States Patent
Bueche et al.

(10) Patent No.: US 9,245,003 B2
(45) Date of Patent: Jan. 26, 2016

(54) METHOD AND SYSTEM FOR MEMORY EFFICIENT, UPDATE OPTIMIZED, TRANSACTIONAL FULL-TEXT INDEX VIEW MAINTENANCE

(71) Applicant: EMC Corporation, Hopkinton, MA (US)

(72) Inventors: Edward C. Bueche, Pleasanton, CA (US); Petr Pleshachkov, The Hage (NL); Shanshan Quan, Shanghai (CN); Sheperd Huang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 117 days.

(21) Appl. No.: 13/631,363

(22) Filed: Sep. 28, 2012

(65) Prior Publication Data

US 2014/0095467 A1 Apr. 3, 2014

(51) Int. Cl.
*G06F 7/00* (2006.01)
*G06F 17/30* (2006.01)

(52) U.S. Cl.
CPC .... *G06F 17/30622* (2013.01); *G06F 17/30324* (2013.01); *G06F 17/30631* (2013.01)

(58) Field of Classification Search
CPC .................................................. G06F 17/30324
USPC ........................................................ 707/715
See application file for complete search history.

(56) References Cited

U.S. PATENT DOCUMENTS

| | | | |
|---|---|---|---|
| 2003/0229626 A1 | 12/2003 | Nayak | |
| 2004/0068541 A1* | 4/2004 | Bayassi et al. | 709/204 |
| 2006/0198306 A1* | 9/2006 | Shen | 370/236.1 |
| 2009/0094236 A1 | 4/2009 | Renkes et al. | |
| 2009/0164437 A1 | 6/2009 | Torbjornsen | |
| 2013/0238628 A1* | 9/2013 | Behnen et al. | 707/741 |

OTHER PUBLICATIONS

International Search Report in corresponding PCT Application No. PCT/US2013/060969 dated Aug. 1, 2014.
Written Opinion in corresponding PCT Application No. PCT/US2013/060969 dated Aug. 1, 2014.
"Inverted Index—Wikipedia" dated Sep. 11, 2011, downloaded from http://wayback.archive.org/web/20120911141849/https://en.wikipedia.org/wiki/inverted_index on Jul. 18, 2014.
International Preliminary Report on Patentability in corresponding PCT Application No. PCT/US2013/060969 dated Mar. 31, 2015.
Anonymous: "Inverted index—Wikipedia, the free encyclopedia," Sep. 11, 2011, Retrieved from http://wayback.archive.org/web/20120911141849/https://en.wikipedia.org/wiki/inverted_index on Jul. 18, 2014.

* cited by examiner

*Primary Examiner* — Ajith Jacob
(74) *Attorney, Agent, or Firm* — Dergosits & Noah LLP; Todd A. Noah

(57) ABSTRACT

Methods and systems are directed to an update-optimized and memory-efficient method for transactional full-text index view maintenance. Embodiments include a method and system of reducing the overhead requirements of maintaining a transactional index view in the case of a large number of updates at any particular time. The method involves maintaining a single blacklist bitmap across updated transactional query views, applying the latest set of updates to the bitmap when a new view is required, and post-adjusting the bitmap when the transactional view is created to ensure that entries that should be visible have not been removed.

18 Claims, 7 Drawing Sheets

METHOD AND SYSTEM FOR MEMORY EFFICIENT, UPDATE OPTIMIZED, TRANSACTIONAL FULL-TEXT INDEX VIEW MAINTENANCE

BACKGROUND

Full-text indexing systems, such as search engine indexing algorithms and document retrieval systems, typically utilize an inverted index (or a "postings file") as an index data structure that stores a mapping from content (e.g., words or numbers) to locations in a database file or document. Inverted indexes generally allow for fast search operations, but may result in greater processing when a document is added to the database. An inverted index is formed by developing a forward index that stores lists of words per document, which is then inverted to develop an inverted index, which lists the documents per word. This speeds the query process by eliminating the need to sequentially iterate through each document and each word using the forward index to verify a matching document. With the inverted index created, the query can be resolved by jumping to the word identifier through random access operations in the inverted index.

Applying updates to a full-text indexing environment is often a challenging task, since the inverted index is designed for fast query and not for updates. Blacklisting deleted entries is a common technique for blocking access to deleted entries, and is generally much more efficient than updating them directly. That is, when blacklisted, a deleted object is essentially virtually deleted as it will be initially found during query processing and filtered out before the query operation completes. Once the index is rebuilt (during normal merge operations) the physical delete can be reflected into the index. This process is required because the post-query filtering of blacklisted objects hurts query performance.

Such procedures are in contrast with B-tree indexes of typical relational databases that are designed to support low-latency direct updates. That efficient-to-update capability allows relational B-tree indexes to be used in online transactional processing (OLTP) applications among others that need low-latency updates. The downside of this index method, however, is that it cannot provide the higher value fuzzy search of inverted full text indexes.

Unlike low-latency transactional database systems, typical full text environments have extremely high latency in reflecting updates. Full text database systems collect all changes and apply them to a new version of the index while the older static version is being queried. This process means that updates take on the order of minutes to hours to be reflected and applied. As a result, these applications sacrifice the low-latency update for the rich quality of search used in information retrieval applications.

A blacklist bitmap is a bitmap that records at least one service that cannot share a resource with the service at the same time. The construction of a transactional query view includes not only determining the set of indexes to use but also getting an up-to-date version of the blacklist bitmaps that reflect the recent changes. The blacklist bitmap must be re-created after another transaction completes to reflect the current changes to the system. In many cases, it is possible to just recreate the blacklist bitmap from the persistent blacklist structures. However, in the event of massive numbers of updates at any particular time, this process can become prohibitively expensive as the list of blacklisted items are scanned and used to create the new blacklist bitmap.

The recreation of this blacklist bitmap can be shared among users of different transactions as long as their transactional views are essentially the same. However, read transactions start and end at different times and write transactions can happen between these complete. This leads to multiple concurrent read transactions having different blacklist bitmaps. The creation of these unique blacklist bitmap views can cause queries to take on the order of up to a minute, as hundreds of thousands of blacklisted entries are processed to create that view.

What is needed therefore, is an improved method of reducing the overhead of maintaining the transactional index view in the case of a large number of updates.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides an update-optimized and memory-efficient method for transactional full-text index view maintenance. Embodiments are directed to a method and system of reducing the overhead requirements of maintaining a transactional index view in the case of a large number of updates at any particular time. The method involves maintaining a single blacklist bitmap across updated transactional query views, applying the latest set of updates to the bitmap when a new view is required, and post-adjusting the bitmap when the transactional view is created to ensure that entries that should be visible have not been removed. To achieve lower-latency, transactional updates to a full text index, a combination of multiple indexes and blacklisted index entries is used. Updates to the database are placed in the new inverted indexes and the corresponding items are blacklisted in the older indexes. When a query executes, the blacklist is typically converted into a bitmap that allows the query to efficiently filter out resulting documents (which are represented as linear document identifiers) and the query is executed across all indexes.

Figure 1:
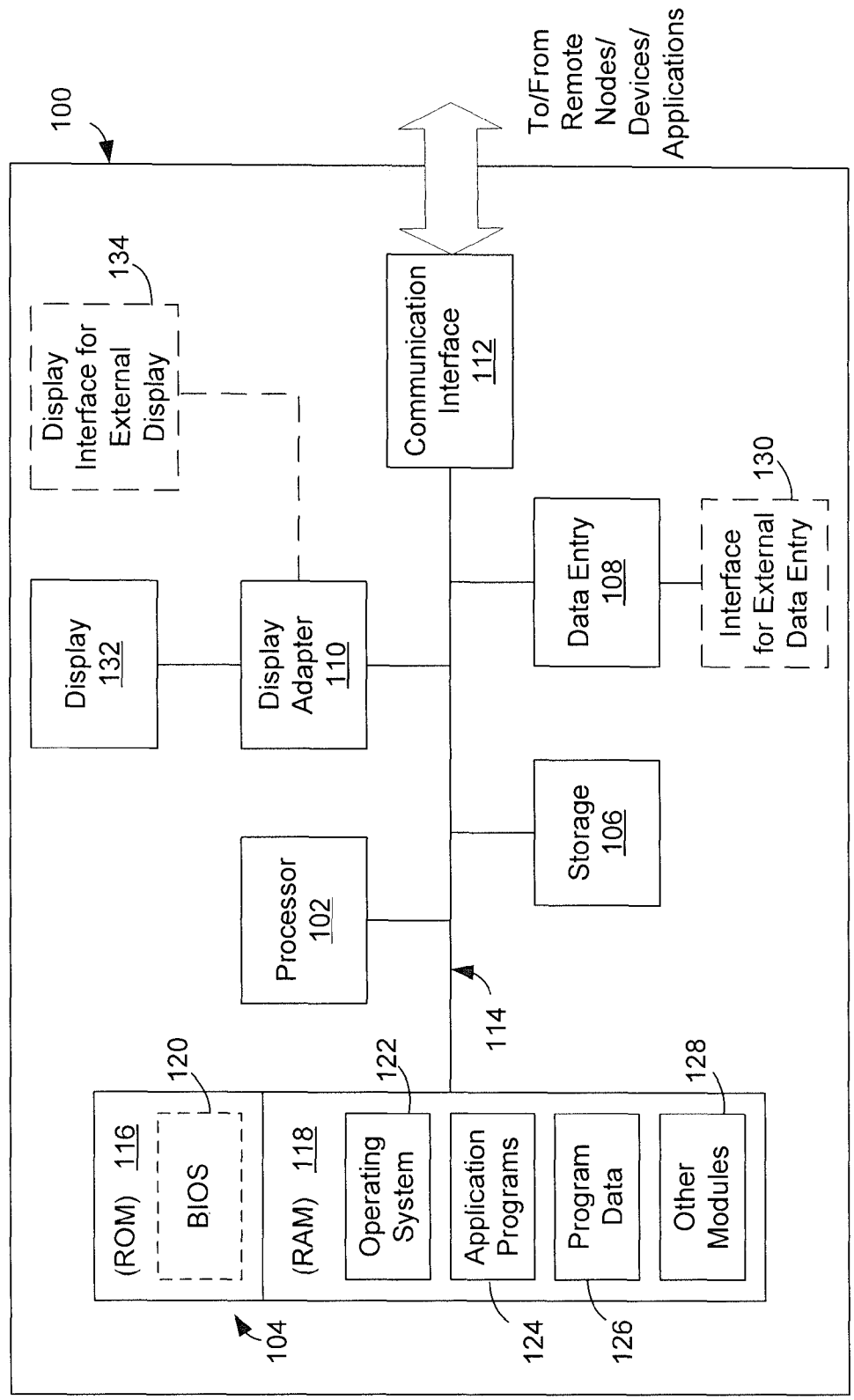
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
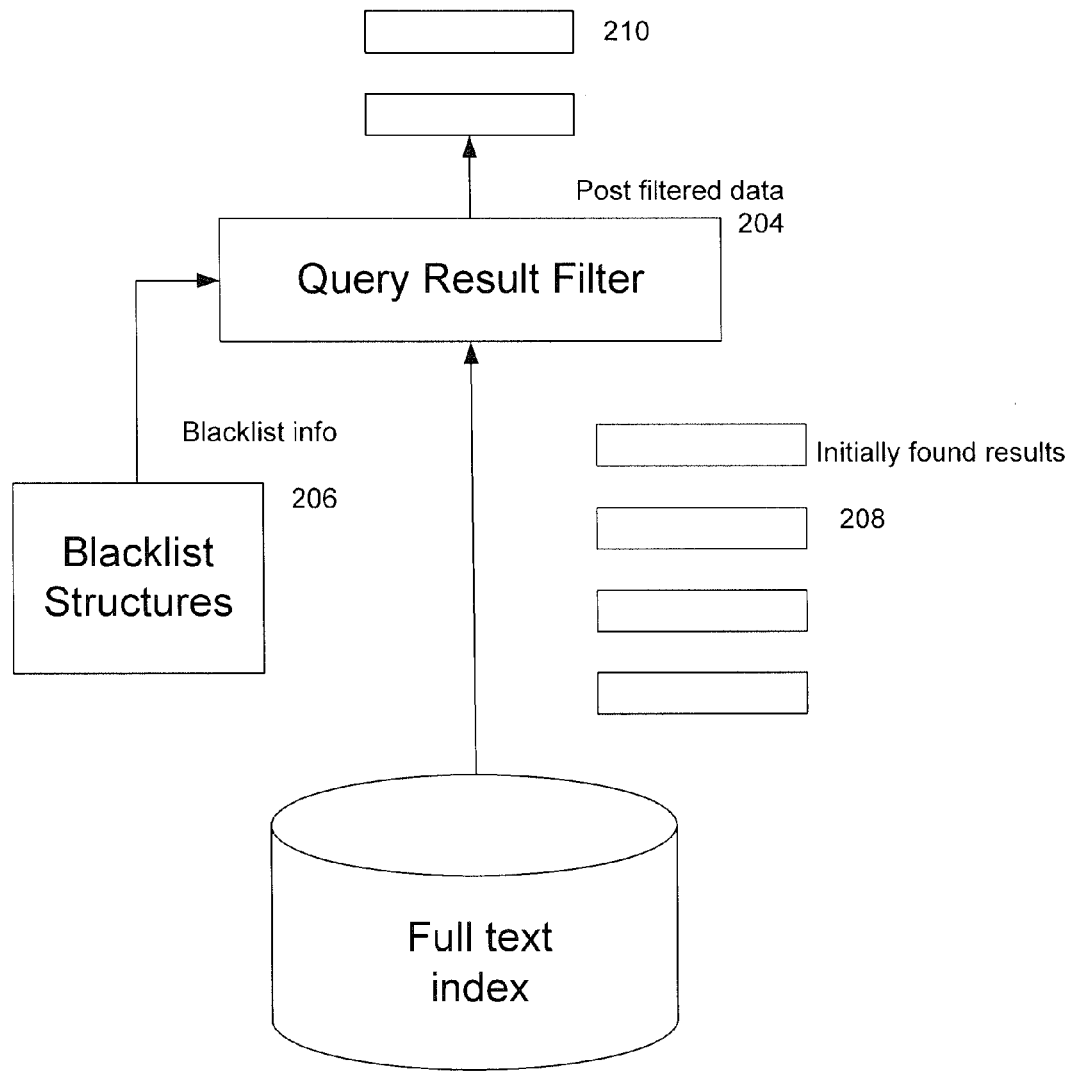
FIG. 2 illustrates an example full text index environment for applying updates, under an embodiment.

FIG. 2 illustrates an example full text index environment for applying updates, under an embodiment. The functions and arrangement of components in FIG. 2 and the other figures illustrated herein may be implemented and/or performed by some or all of the components of the hardware device 100 of FIG. 1. System 200 may be implemented in a network that includes a number of client computers that may be embodied in any type of appropriate computer or computing device, such as workstations, personal computers, portable computers, smartphones, personal digital assistants (PDAs), tablet computers, and any similar device. The network clients access data, such as content, data, any other network resources that are stored in data storage 202. Data storage 202 is a random access storage device that may be implemented through any number of individual persistent storage devices, such as a hard drive, RAID arrays, and so on. In certain embodiments, sequential storage devices, such as tape storage devices may also be used. The data storage element 202 may appear as a single storage repository to the clients in network 200, even though it may be embodied in a number of individual storage devices.

System 200 of FIG. 2 illustrates a portion of a full text search environment, such as used in a text retrieval application in which a search engine processes user queries to find documents or collections in a full text database. System 200 includes an indexing function along with the searching function to facilitate the searching of a large number of documents. An indexer scans the text of all the documents and builds a list of search terms, called an index. When performing a specific query, only the index is referenced rather than the text of the original documents. The indexer makes an entry in the index for each term or word found in a document and possibly its relative position within the document. The blacklist structure 206 stores a blacklist bitmap in which the documents in the database are represented with numeric identifiers within the index. The bitmap is a data structure in which each bit in which each bit indicates whether or not a corresponding document is blacklisted or not.

As shown in FIG. 2, a full text index 202 stores the indexes of the documents. Upon the processing of a query, a set of initially found results 208 is returned. A query result filter process 204 uses black list information 208 provided by blacklist structures 206 on the initially found results 208 to produce post-filtered data 210. When a read-transaction starts, the system pulls a cached view if available for the query. This cached view comprises the indexes 202 plus blacklist bitmaps 208. If the cached view was not available, it is created from scratch. This would include reading the persistent blacklist structure 206 to construct a new blacklist bitmap.

In an embodiment, the blacklist bitmap is derived or constructed using numerical document identifiers. Each document has a numerical document identifier starting at a certain number, such as 0. This identifier defines a mapping for the bitmap. Thus, for example, there is in the blacklist structure a document with identifier 5, then in the bitmap, the bit in position 5 will be set to value 1.

The cached view is invalidated when any read-write transaction commits. In this approach, the user may be penalized with the construction of this bitmap. For small numbers of index updates there is generally no issue, however, in use-cases where the system is faced with a massive number of updates, this may be extremely expensive from an execution perspective, especially in environments where older documents are updated. In such cases a massive number of blacklist entries accumulate on the large final index making any recreation of the bitmap extremely expensive.

Embodiments of the index maintenance method described herein are intended to work with multiple indexes and/or multiple segments. In general, an index comprises a plurality of segments, and each segment is a grouping of posting lists in a dictionary, such at each segment is a portion of an index. The maintenance technique can be either segment-based or index-based depending upon the requirements of the application and implementation.

Figure 3:
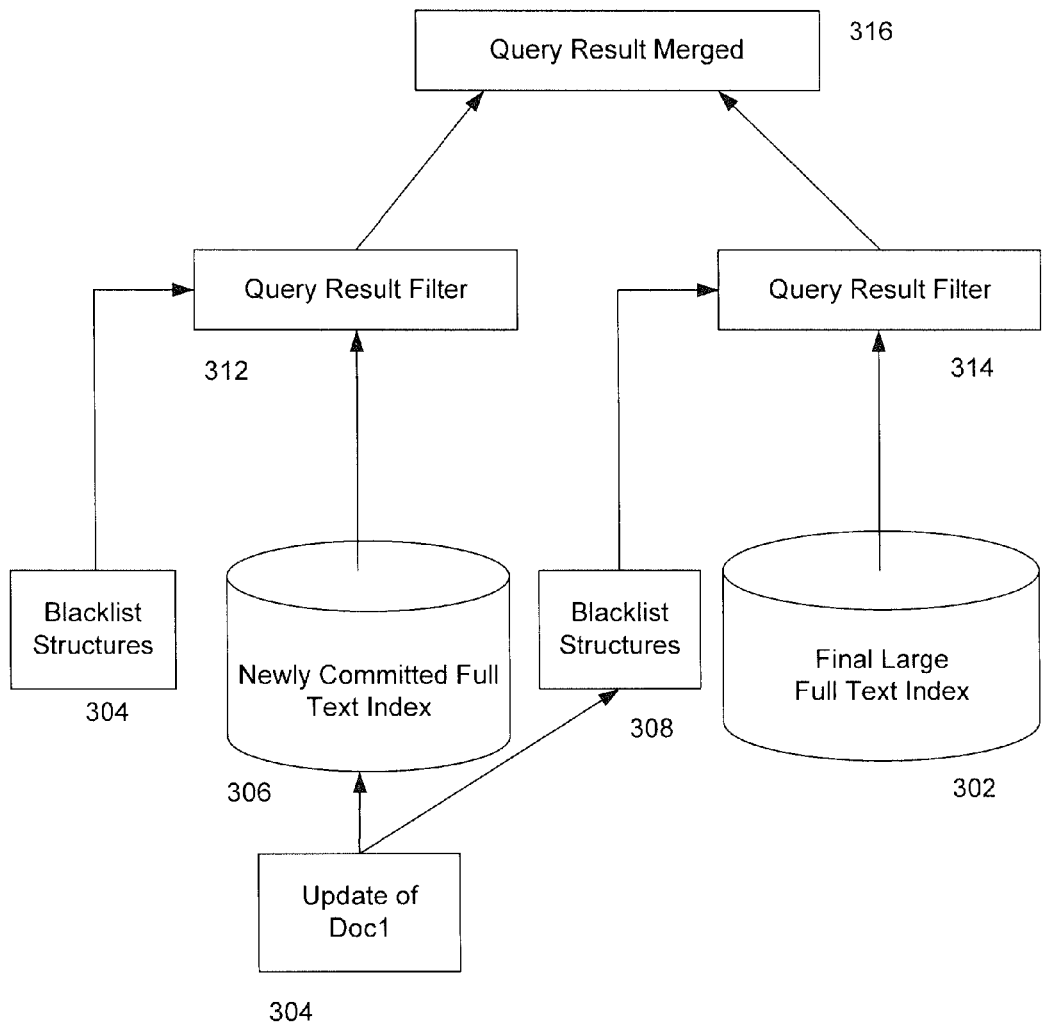
FIG. 3 illustrates a process of updating documents in a full text index environment, under an embodiment.

FIG. 3 illustrates a process of updating documents in a full text index environment, under an embodiment. As shown in diagram 300, updates 304 to a document in the full text index will place the document in a newly-committed full text index 306. The document will be blacklisted in an older global index 308. In this situation, the normal activity of index maintenance leads to a situation where new indexes are created from a combination of smaller, recently updated indexes. This leads to the need for the blacklist bitmaps to be invalidated and to be rebuilt. This updating/maintaining can happen in the query but this can result in large overhead requirements to recreate the bitmap. In an embodiment, the bitmap cache 310 is also maintained and rebuilt during merge periods as well to avoid any user from paying this cost.

When a read-transaction starts, the process pulls a cached view (if available) for the query. If the cached view (indexes plus blacklist bitmaps) is not available, then the process creates it from scratch. This would include reading the persistent blacklist structure 308 to construct a new blacklist bitmap. The cached view is invalidated when any read-write transaction commits. The blacklist bitmap is updated with only recent incremental changes. The general penalty associate with deriving the blacklist bitmap is thus significantly reduced since normally only the latest changes need to reflected, instead of requiring that all changes be reflected. Having a single bitmap cache (that is adjusted during the view creation) minimizes the amount of memory needed for this, and makes it essentially independent of the number of users that are sending search requests. Recreating the blacklist bitmap cache during index merge in most cases prevents users from experiencing any penalty during the view rebuild, which can be exacerbated if there are long periods between queries.

In an embodiment, the merge index operation is a periodic background activity that runs to combine smaller indexes into bigger indexes and reflect blacklists. The merge index operation creates a set of new indexes for which a new bitmap cache is constructed. This procedure may also go through all other indexes and reflect recent updates in their respective bitmap caches. As a result of this feature, queries are not required to spend time to get up-to-date versions of the bitmap cache.

Figure 6A:
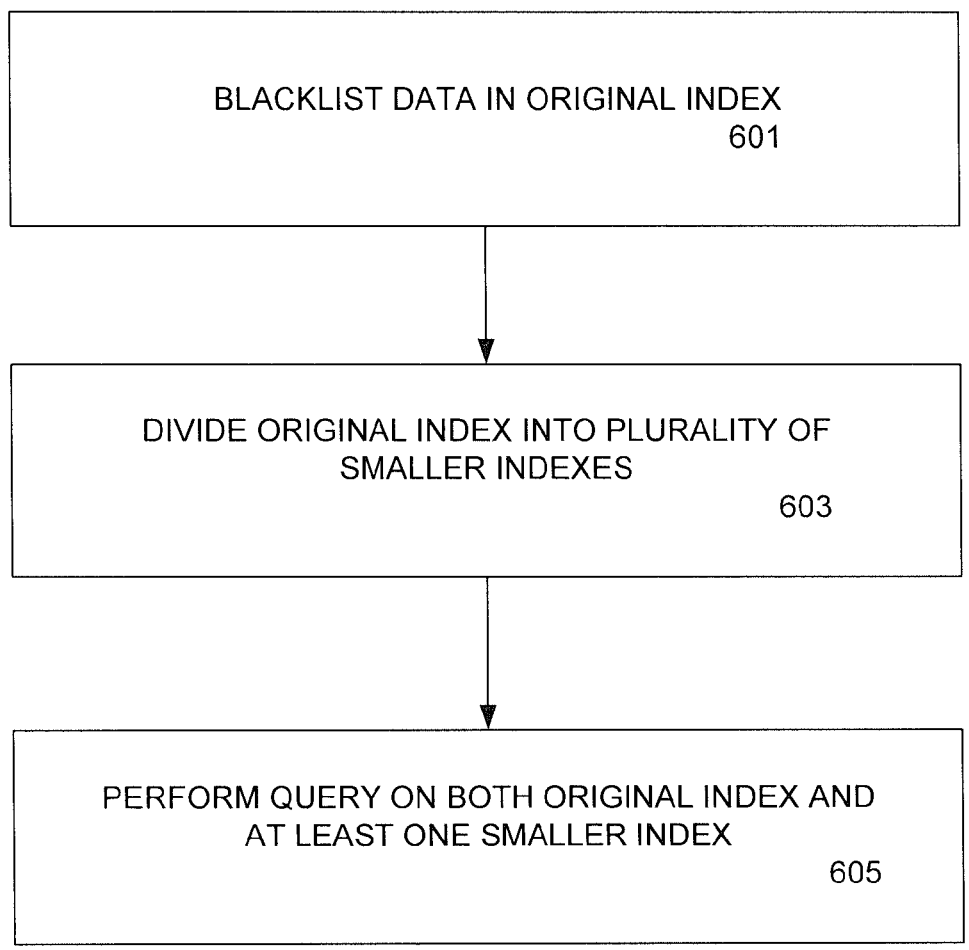
FIG. 6A is a flowchart that illustrates a method of maintaining an index in a full text environment, under an embodiment

In an embodiment, the full text index data 302 is blacklisted in an original blacklist index 308. The blacklist data is also divided into a number of smaller indexes 310. The query, as processed by query filters 312 and 314 are then performed on one or both indexes—the original index and the smaller indexes, and is usually performed on the original index and at least one of the smaller indexes. The query results are then merged to generate merged query results 316. FIG. 6A is a flowchart that illustrates a method under this embodiment.

Figure 4:
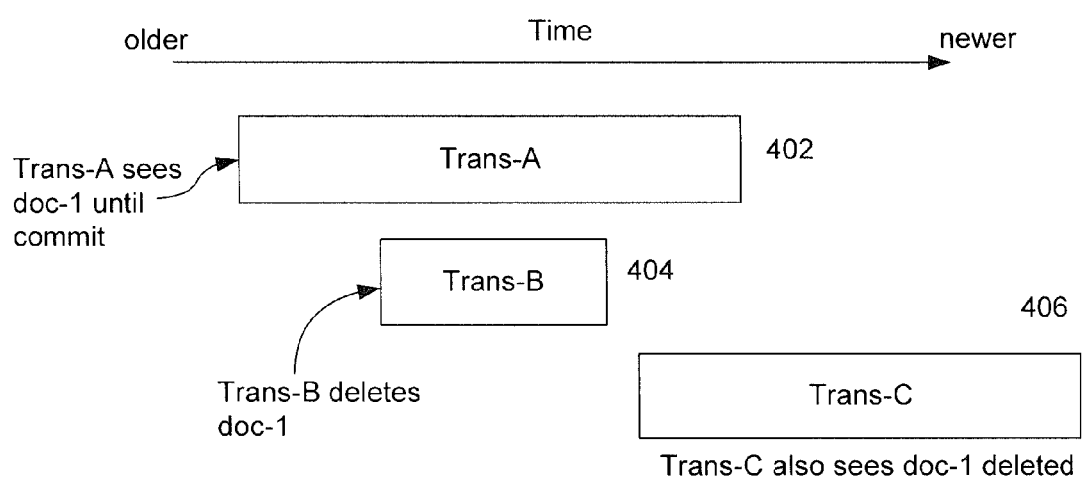
FIG. 4 illustrates different views of a document depending on transaction behavior to illustrate operation of bitmap caching methods, under an embodiment.

FIG. 4 illustrates different views of a document depending on transaction behavior to illustrate operation of bitmap caching methods, under an embodiment. FIG. 4 illustrates the notion that not every transaction sees the same view of the database at the same time. As shown in the example of diagram 400, transaction A 402 is started at a particular point in time and followed in time by transaction B 404, which ends before transaction A completes. After transaction B, but also before transaction A completes, a third transaction C 406 is initiated. For purposes of illustration, transaction A is a read-only transaction, transaction B is a read/write transaction, and transaction C can be either a read-only or a read/write transaction. Each transaction is assumed to access the same document, document 1. In the situation, where transaction B deletes document 1, transaction A is able to view the document even after the deletion operation of transaction B commits because its view is consistent with the version of the database from the point when it started the transaction. Transaction C sees document 1 deleted because it started after the completion of transaction B. In this case a new query view is needed, as the previous query view cannot be used. This illustrates the possible difference in views at the same time by different transactions at the same time. In an embodiment, an index maintenance system is implemented so that in transactions in query based systems (full text index systems) can view updates through a consistent view of database, without requiring blocking mechanisms, similar to what is currently possible in transaction based systems.

The example of FIG. 4 illustrates a situation in which new views of the database require that the cache be flushed and updated to provide consistent viewing of the database. Many database changes result in changes to the blacklist bitmap, and the need for many cache flush operations, which can be expensive. In an embodiment, the index is maintained through incremental rebuild of the blacklist bitmap instead of entire rebuild of the blacklist bitmap.

Figure 5:
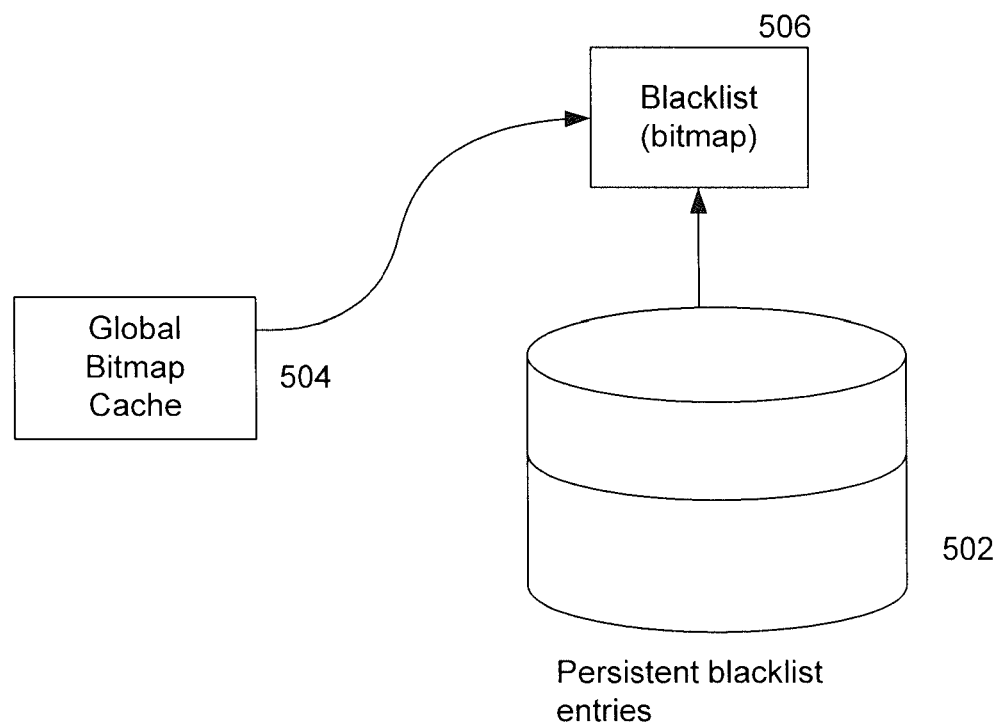
FIG. 5 illustrates the use of a single global bitmap cache, under an embodiment.

FIG. 5 illustrates the use of a single global bitmap cache, under an embodiment. As shown in diagram 500, persistent blacklist entries 502 are used to produce a single blacklist bitmap 506. The bitmap is cached in global bitmap cache 504. In an embodiment, the bitmap cache is essentially a vector of bits that grows in size as needed. Each component of a bitmap has a Boolean value. The position of the bit in the vector corresponds to the document identifier. If the bit is set to 1 then the document is in the blacklist, and if the bit is set to 0 then the document is not in the blacklist. Alternatively, the opposite Boolean values can be used to denote presence or absence, i.e., 0 can denote presence and 1 can denote absence of the document in the blacklist. By caching the bitmap with all of the changes, it is possible to read only a small number of blacklisted entries from the persistent blacklist store 502. This results in much less processing than previous methods in which the entire blacklist bitmap is dropped and rebuilt.

In an embodiment, the bitmap cache 504 comprises an ordered list of transactions organized by log sequence number (LSN). The LSNs are assigned in an ascending order and implemented as a logical address of the log record created to track changes made by transaction. The list of transactions in a bitmap is ordered by LSN of first log record created by transaction.

Figure 6B:
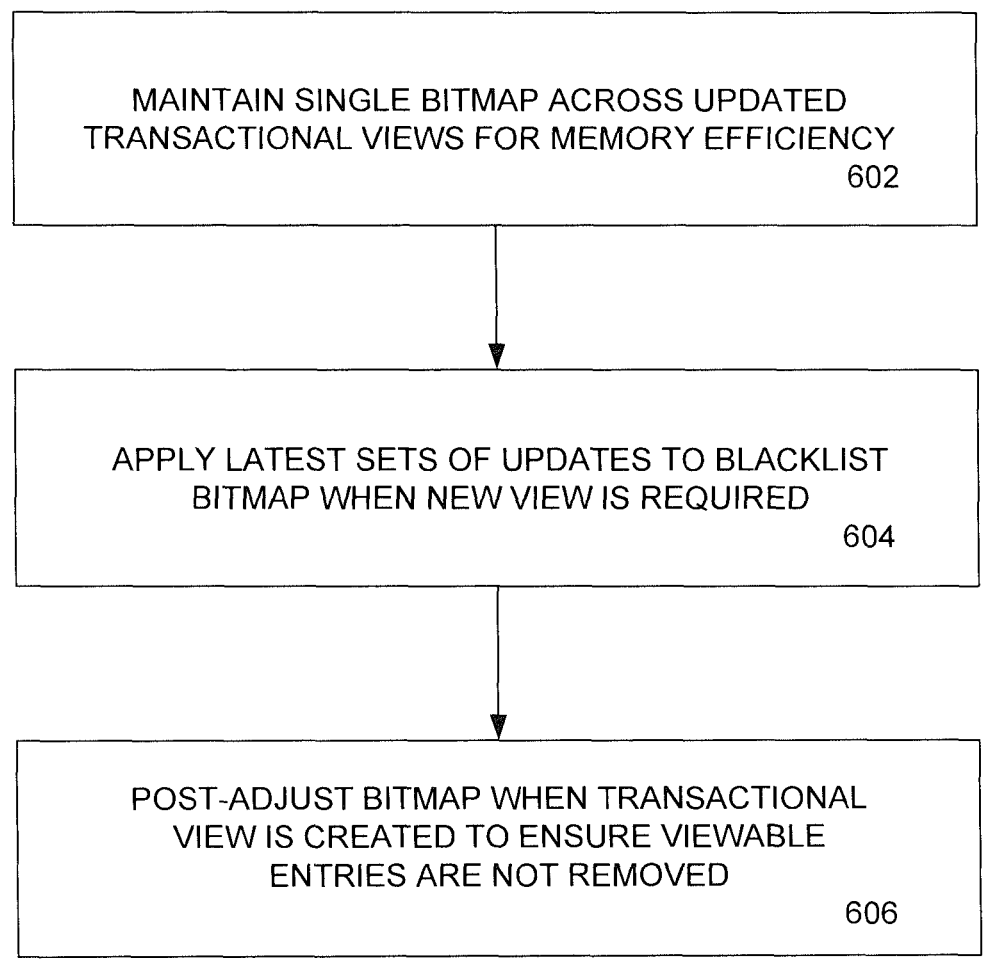
FIG. 6B is a flowchart that illustrates a method of maintaining a single blacklist bitmap, under an embodiment.

FIG. 6B is a flowchart that illustrates a method of maintaining a single blacklist bitmap, under an embodiment. As shown in flowchart 600, the method maintains a single blacklist bitmap across updated transactional query views, block 602. In general, a single bitmap is memory efficient). The method then applies the latest set of updates to the bitmap when a new view is required, block 604. The latest set of updates comprises only updates committed between the new view and a most immediate preceding view. The bitmap is further post-adjusted when a transactional view is created to ensure that the process has not removed entries that the user should be able to see, block 606.

Aspects of the methods described herein should generally prove advantageous in a system in which the rate of updates to documents is very high and may be delayed due to workflow processing. That is, a normal full text index environment could have many updates that happen fairly close to the time that the original object was created. This is especially true in certain batched application in which creation generates a large number of updates, followed by a larger number that occur several days later due to workflow processing. In this case, the blacklisting activity is not confined to the most recent indexes, but instead, covers the final index itself (which was merged only once-a-day, or in a similar period).

The improvements provided by the index maintenance system described herein combine to a user perceived enhancement that query response time is fast (view creation negligible) and index latency is low as well. In the latter case this means that the documents are searchable very quickly after being saved to the system allowing the search engine to service a wider number of applications, essentially bringing this "fuzzy search" technology to a realm that was normally serviced only by structured relational databases.

In an example implementation of systems described herein, one or more server computers may be part of a multitenant database platform including to client and storage node networked computers. The network interfaces between these computers may include one or more routers that serve to buffer and route the data transmitted among the computers. The network may be the Internet, a Wide Area Network (WAN), a Local Area Network (LAN), or any combination thereof. The server and storage node computers may be server level computers capable of supporting multiple computers or terminals, and database storage resources. The network may represent any appropriate client-server network, such as a cloud-computing environment in which computing resources and storage capacity is provided as a service to a number of different clients. As stated above, an illustrative application of such an environment is a multi-tenant database system in which various elements of hardware and software of the database system may be shared by one or more customers. For example, a given application server may simultaneously process requests for a great number of customers, and a given database table may store data elements for a potentially large number of clients. In this type of environment, each of the servers may implement control logic that controls access by different clients using storage nodes that each implement a dynamic volume sharing process.

In the present disclosure, the use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method of maintaining an index of elements stored in a database for use in a query-based, full-text search environment, the method comprising:

blacklisting data in an original index of the database, wherein the blacklist is represented as a blacklist bitmap indicating a blacklist status of each element in the database, the blacklist bitmap comprising a data structure having a sequence of bits, each assigned a Boolean value, wherein a first Boolean value denotes the presence of a document in the blacklist and a second Boolean value denotes the absence of a document in the blacklist;

dividing the original index into a plurality of smaller indexes;

performing a query on both the original and at least one of the plurality of smaller indexes.

2. The method of claim 1 wherein the elements comprise documents searchable by a search engine.

3. The method of claim 1 wherein the blacklist bitmap uses a numerical document identifier associated with each element.

4. The method of claim 3 wherein each numerical document identifier defines a mapping for the blacklist bitmap.

5. The method of claim 2 wherein the data structure further including transactions organized by a plurality of log sequence numbers.

6. The method of claim 1 wherein the log sequence numbers are assigned in an ascending order and implemented as a logical address of a log record created to track changes made by a transaction.

7. A system for maintaining an index of elements stored in a database for use in a query-based, full-text search environment, the system comprising:

a processor-based database management system executed on a computer and configured to:

blacklist data in an original index of the database, wherein the blacklist is represented as a blacklist bitmap indicating a blacklist status of each element in the database, the blacklist bitmap comprising a data structure having a sequence of bits, each assigned a Boolean value, wherein a first Boolean value denotes the presence of a document in the blacklist and a second Boolean value denotes the absence of a document in the blacklist;

divide the original index into a plurality of smaller indexes;

perform a query on both the original and at least one of the plurality of smaller indexes.

8. The system of claim 7 wherein the elements comprise documents searchable by a search engine.

9. The system of claim 7 wherein the blacklist bitmap uses a numerical document identifier associated with each element.

10. The system of claim 9 wherein each numerical document identifier defines a mapping for the blacklist bitmap.

11. The system of claim 8 wherein the data structure including transactions organized by a plurality of log sequence numbers.

12. The system of claim 7 wherein the log sequence numbers are assigned in an ascending order and implemented as a logical address of a log record created to track changes made by a transaction.

13. A computer program product, comprising a non-transitory computer-readable medium having a computer-readable program code embodied therein, the computer-readable program code adapted to be executed by one or more processors to implement a method comprising:

blacklisting data in an original index of the database, wherein the blacklist is represented as a blacklist bitmap indicating a blacklist status of each element in the database, the blacklist bitmap comprising a data structure having a sequence of bits, each assigned a Boolean value, wherein a first Boolean value denotes the presence of a document in the blacklist and a second Boolean value denotes the absence of a document in the blacklist;

dividing the original index into a plurality of smaller indexes;

performing a query on both the original and at least one of the plurality of smaller indexes.

14. The computer program product of claim 13 wherein the elements comprise documents searchable by a search engine.

15. The computer program product of claim 14 wherein the blacklist bitmap uses a numerical document identifier associated with each element.

16. The computer program product of claim 15 wherein each numerical document identifier defines a mapping for the blacklist bitmap.

17. The computer program product of claim 14 wherein the data structure including transactions organized by a plurality of log sequence numbers.

18. The computer program product of claim 15 wherein the log sequence numbers are assigned in an ascending order and implemented as a logical address of a log record created to track changes made by a transaction.

\* \* \* \* \*